ROOF RIDGE VENTILATOR
Original Filed Jan. 2, 1970 3 Sheets-Sheet 1
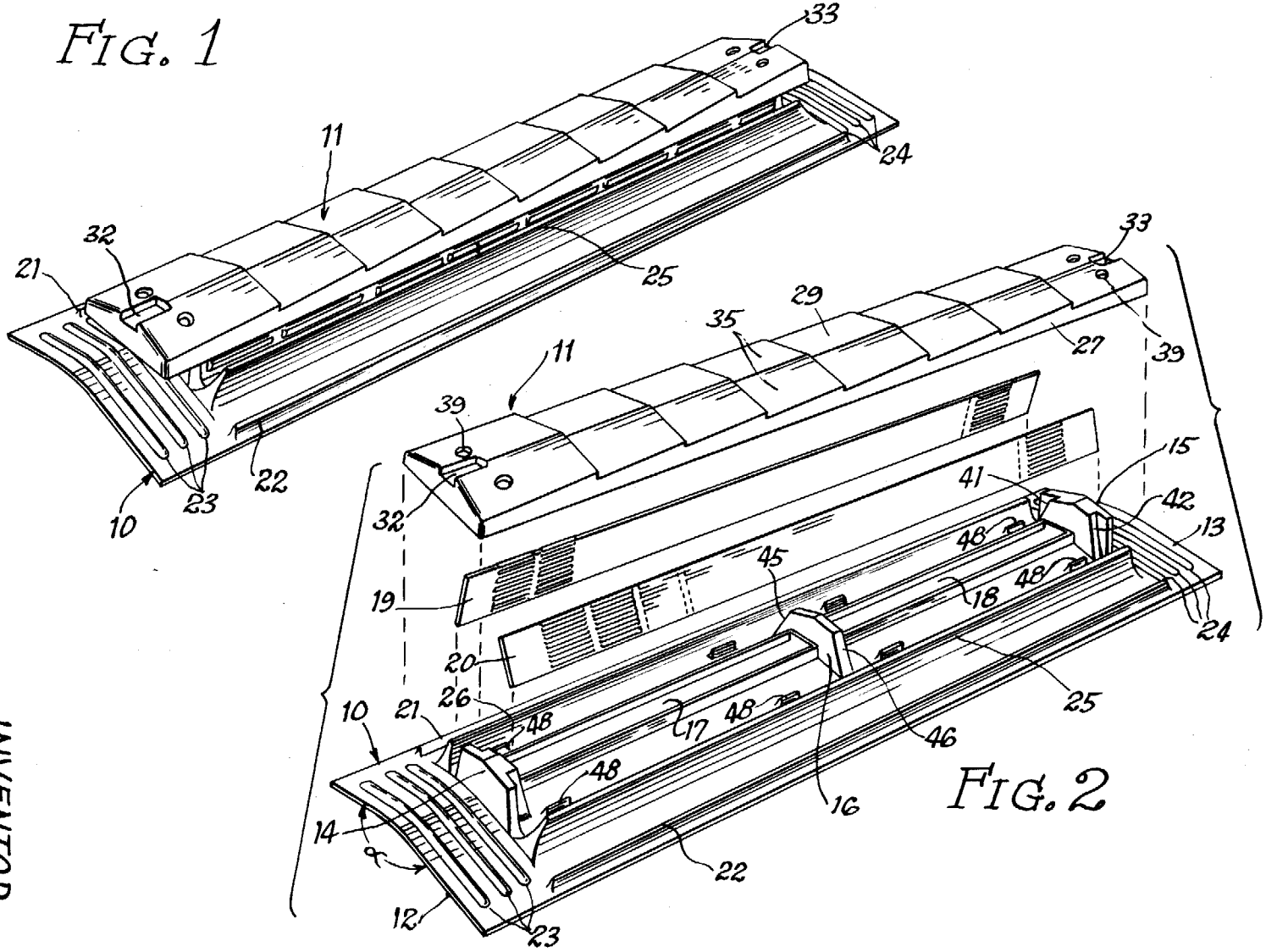
INVENTOR
Lester L. Smith
By Davis, Lucas, Brewer and Brugman Att'ys ROOF RIDGE VENTILATOR
Original Filed Jan. 2, 1970 3 Sheets-Sheet 2
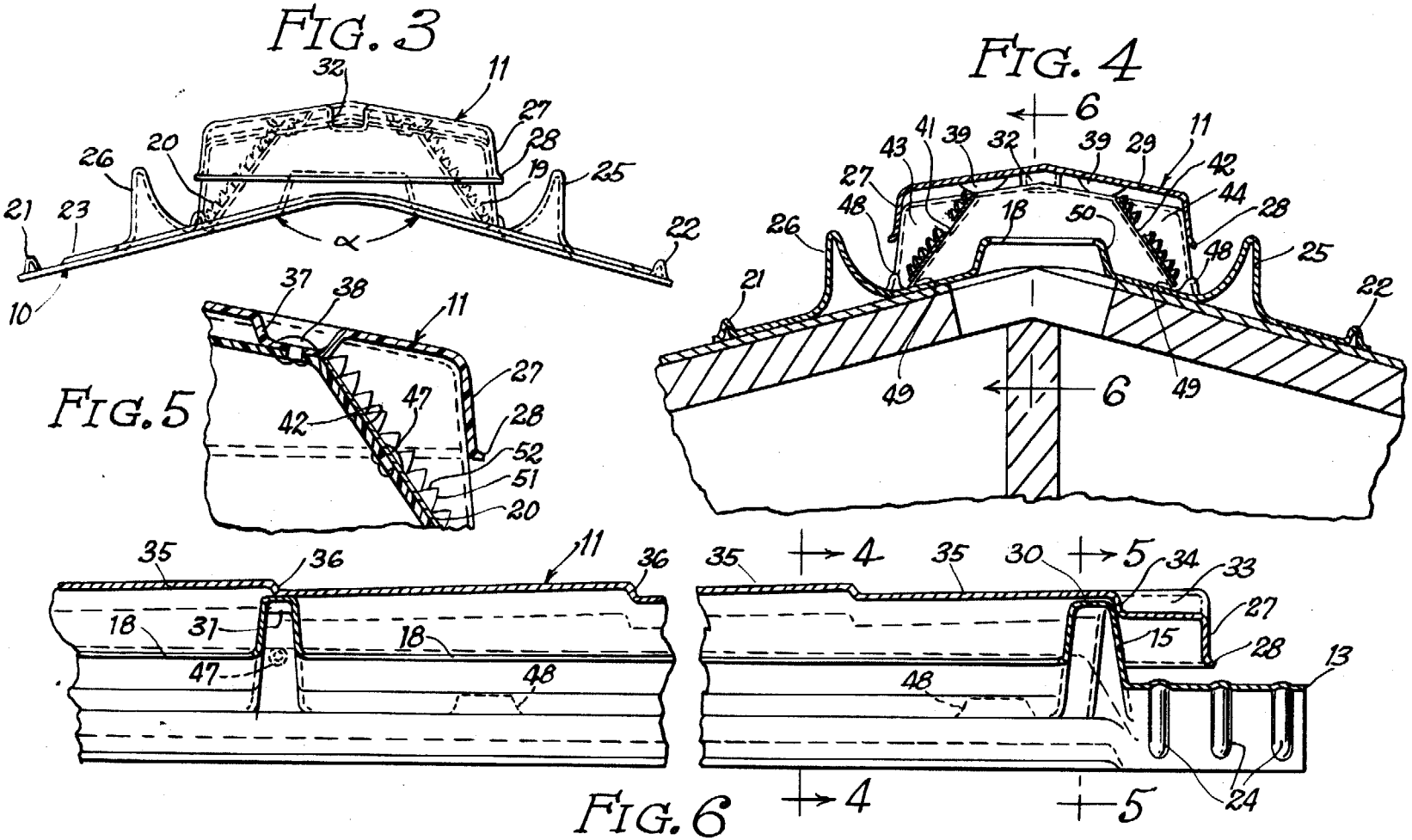

ROOF RIDGE VENTILATOR

Original Filed Jan. 2, 1970 3 Sheets-Sheet 3

United States Patent Office

Re. 27,943
Reissued Mar. 19, 1974

27,943

ROOF RIDGE VENTILATOR

Lester L. Smith, Peoria, Ill., assignor to H. C. Products Co., Princeville, Ill.

Original No. 3,625,134, dated Dec. 7, 1971, Ser. No. 16, Jan. 2, 1970. Application for reissue June 16, 1972, Ser. No. 263,701

Int. Cl. F24p *7/02*

U.S. Cl. 98—42 11 Claims

Matter enclosed in heavy brackets [ ] appears in the original patent but forms no part of this reissue specification; matter printed in italics indicates the additions made by reissue.

ABSTRACT OF THE DISCLOSURE

A roof ridge ventilator made of molded plastic parts except for louvered metal sheets closing the open sides of the ventilator, the design providing a low silhouette with a large air flow area through the louvered sheets by sloping the louvered sheets. Stiffness is built into the thin flashing forming part of the ventilator by molding beads into the flashing to inhibit buckling, particularly under extremes of temperature. The ventilator is formed from two molded parts to one of which the louvered sheets which, when fastened together, form a unit which may be installed in multiples to cover any desired length of roof ridge vent opening.

BACKGROUND OF THE INVENTION

This invention relates to roof ridge ventilators made principally of sheet plastic material.

Prior roof ventilators designed and manufactured by applicant were either of the roof ridge type [which straddled an elongated opening at the ridge type] which straddled an elongated opening at the ridge of the roof, or of a relatively symmetrical design such as a square or circle intended for placement over a symmetrical opening located on a side of a peaked roof. The roof ridge type was fabricated from sheet metal parts to form units which could be placed end-to-end over an elongated roof ridge opening. The side-mounted type was smaller and more compact, and although initially made of sheet metal, was subsequently changed in design and made of molded plastic sheets (see Smith et al., U.S. Pat. No. 3,238,862), with the exception of a louvered portion which could more conveniently be made of sheet metal. The molded form, when manufactured in large quantities, proved to have several advantages over the sheet metal form among which were lower cost, lighter weight, absence of corrosion, and permanent color. The change from the sheet metal to molded plastic in the roof ridge ventilator, however, presented problems in design since the sheet metal design did not lend itself to molding.

SUMMARY OF THE INVENTION

The principal object of this invention is to provide a roof ventilator adapted to be installed over openings in the roof located at the ridge thereof, said ventilator having a low silhouette and being otherwise formed to be as inconspicuous as possible, but which nevertheless provides a large free area therein for the passage of a maximum quantity of air therethrough.

As a more specific object, this invention seeks to provide a ventilator for mounting over openings in a roof located at the ridge thereof wherein access to or from the openings can be effected only through louvers formed in a metal sheet, said louvered sheet being so disposed in the ventilator as to block entry of rain, hail or snow into the openings, but to provide nevertheless a large free area through which the air escaping from the interior of the roof can pass.

A further specific object of this invention is to provide a roof ridge ventilator of low silhouette which, although made principally of molded plastic parts, will retain its shape in extremes of temperature.

DESCRIPTION OF DRAWINGS

These and other objects of this invention will become apparent from the following detailed description of a preferred embodiment of the invention when taken together with the accompanying drawings in which:

FIG. 1 is a plan view in perspective of an assembled roof ridge ventilator unit;

FIG. 2 is an exploded view of the ventilator of FIG. 1;

FIG. 3 is an end elevational view on an enlarged scale of the roof ridge ventilator;

FIG. 4 is an end elevational view in section of the ventilator of FIG. 1 taken along line 4—4 of FIG. 6; and on the scale of FIG. 3;

FIG. 5 is a fragmentary, still further enlarged end elevational view in section taken along line 5—5 of FIG. 6;

FIG. 6 is a fragmentary side elevational view in section of the ventilator, on the scale of FIG. 3, the section being taken along line 6—6 of FIG. 4.

DESCRIPTION OF THE PREFERRED EMBODIMENT

Figure 7:
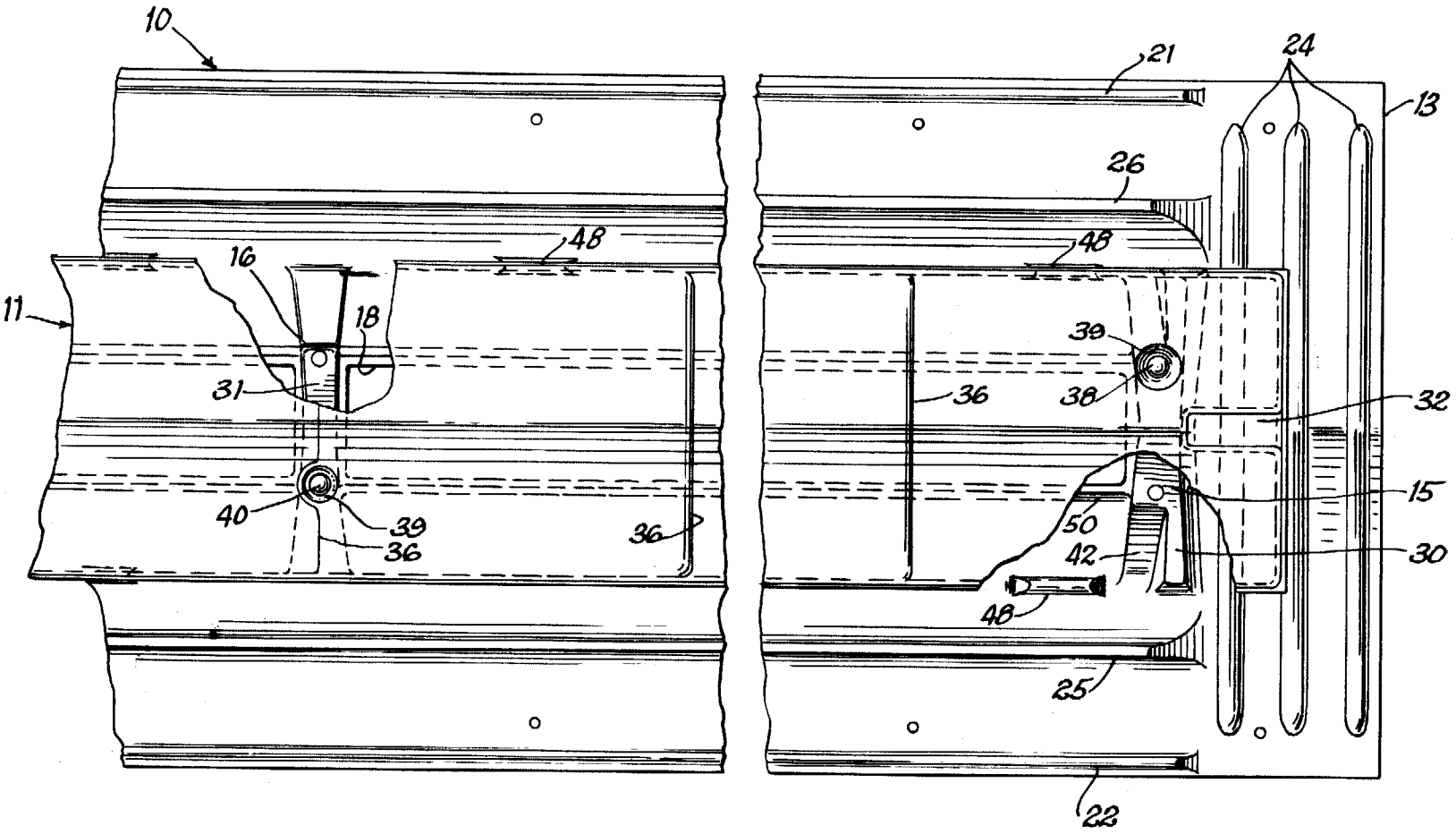
FIG. 7 is a fragmentary plan view of the ventilator of FIG. 6 with portions cut away to show the construction of certain supports thereof.

By way of general description the roof ridge ventilator of this invention is comprised of two molded flastic parts which when assembled define a pair of elongated side openings symmetrically located relative to the ridge through which air from within the roof of the structure may pass. These openings are covered by metal louvers which are so proportioned and disposed as to prevent rain, snow, sleet and hail from passing therethrough into the roof. The metal sheets are inclined to the vertical so that the louvers therein provide openings the sum of the areas of which is at least as great as the area of an opening formed in the lower of the plastic sheets which is disposed over a corresponding opening in the roof ridge. Both of the first said pieces are made from molded sheet plastic and are formed in a manner to provide beads, folds, flanges and other nonplanar contours earh of which provides stiffness for the molded piece in a desired direction. The lowermost sheet or piece constitutes the base for the ventilator and has flashing formed integrally therewith by which the base can be nailed or otherwise secured to the roof.

Referring now to FIG. 2 for a detailed description of the preferred form of ventilator illustrated therein, the two molded plastic parts of the ventilator are comprised of a base 10 and a cover 11 both being of elongated rectangular form. Base 10 is symmetrically formed with respect to a longitudinal center line corresponding to the highest point of the roof ridge over which the base is to be secured. Base 10 is molded with an obtuse angle $\alpha$ which is substantially the same as the angle between the sides of the peaked roof to which the base is to be applied.

Inwardly from the end edges 12 and 13 of base 10 are formed end posts 14 and 15 which are substantially identical except that they face one another. Between end posts 14 and 15 is formed a center post 16 which is of substantially the same height as posts 14 and 15, all three posts serving as supports for top 11. Elongated openings 17 and 18 are formed in the central region of base 10 between posts 14 and 16, and 16 and 15, respectively. The air to be vented from the roof passes upward through openings 17 and 18 between top 11 and base 10 and laterally into the surrounding atmosphere. The space between top 11 and base 10, however, is shielded from exterior precipitation by louvered metal strips 19 and 20 appropriately supported by posts 14, 15 and 16, firmly secured thereto as will hereinafter be described.

The side and end regions of base 10 are stiffened by longitudinal ribs 21 and 22 and by transverse ribs 23 and 24, the latter being disposed between end post 14, and edge 12 at the one end, and end post 15 and edge 13 at the other end.

As shown in FIG. 1, cover 11 is shorter and narrower than base 10. Between each longitudinal rib 21, 22 and the corresponding side of cover 11 is formed on base 10 a wind deflector rib 25 and 26 respectively (FIG. 2). Said wind deflector ribs are quite high and so contoured that wind moving across the ventilator from one side to the other will strike one or the other of the deflector ribs 25, 26 and will be deflected over the cover 11 thereby. According to aerodynamic principles, this creates a subatmospheric pressure on the opposite side of the cover which then assists in drawing air out of the roof ridge through openings 17, 18 and through the respective louvered strip 19 or 20 as the case may be.

The details of construction of the ventilator are shown in FIGS. 3–7 inclusive, to which reference is now made. Cover 11 is formed with a depending peripheral flange 27 which terminates in an outwardly turned edge 28 to provide stiffness for the unsupported edge of said flange 27. Cover 11 is formed symmetrically about the same longitudinal centerline as base 10, and its top surface 29 is sloped downwardly from said centerline at a small angle which is less than the corresponding angle of the base 10, and its top surface 29 and base 10 diverge slightly from said centerline. The tops 30 of the end posts 14, 15 and top 31 of center post 16 are formed with similar angles such that cover 11 may be made to rest upon and be supported by said posts. As shown in FIG. 4, the transverse dimension of each post is substantially equal to the transverse dimension between the opposite sides of flange 27 such that cover 11 is located on the base in a transverse direction by said posts. Cover 11 is longer than the dimension between end posts 14 and 15, but it is located in an endwise direction on base 10 by inwardly formed bosses 32 and 33 (FIGS. 1 and 6) the inner ends 34 of which abut upon the outer sides of end posts 14 and 15.

A feature of this invention is the formation of the upper surface 29 of cover 11 in a manner to simulate overlapping shingles nailed to a roof ridge. As shown in FIG. 6 such formation results in a series of sloping surfaces 35 connected by upwardly disposed sections 36. This leaves a somewhat indeterminate surface upon which to rest the cover, and therefore, instead of depending upon said sloping surfaces 35 for support inwardly formed bosses 37 are provided in the cover over posts 14 and 15, as shown in FIG. 5, which are calculated to rest upon the upper surfaces or tops 30 of the end posts, at which point a rivet 38 may be applied for firmly securing the cover 11 to said end posts. Similar bosses 39 (FIG. 7) are formed in cover 11 over center post 16, and the cover is secured to said post 16 at bosses 39 by rivets 40. It is understood that two such rivets are used at each end or center post to furnish adequate support and fastening for the cover upon said posts.

Each end post 14 and 15 is formed with symmetrically disposed sloping substantially flat surfaces 41 and 42 on the side of the end post facing center post 16. These sloping surfaces 41 and 42 form, in effect, a step or ledge on each side of the post relative to the line of symmetry of the ventilator so as to leave inner, vertically disposed end walls 43 and 44, respectively, the function of which is to locate louvered metal strips 19 and 20 endwise on the ventilator. Center post 16, in the form selected to illustrate this invention has only the sloping walls 45 and 46 (FIG. 2) which are aligned with the sloping walls or ledges 41 and 42 of the end posts 14 and 15. Thus louvered metal strips 19 and 20 may be made of a length sufficient to reach from inner wall 44 of the outer end post and to rest upon the sloping wall 45 or 46 of the center post 16. As shown in FIG. 5, the louvered metal strip may be secured to such sloping walls by rivets 47 passing through the lands on the strip at the ends and between the louvers of the center of the strip.

It may be noted that at longitudinally spaced intervals on base 10 near the lower edges of the deflectors 25 and 26 are formed vertically extending lugs 48 which serve as abutments against which the bottoms of the louvered strips may rest. The relationship of the lugs 48 to the sloping walls 41 and 42 on the end posts is such that when a louvered strip is mounted on sloping walls 41 or 42 with its bottom edge abutting aginst a lug 48 a small clearance 49 is created through which any water which may find its way through the louvers of the strips 19 or 20 and into the space between the louvered strips may flow down the base toward the wind deflectors 25 or 26, then therealong around an end thereof to the end flashings and thence downward off base 10 and upon the roof.

As an additional deterent to the entry of water into the openings 17 or 18, it may be noted from FIG. 4 that each said opening is formed in the top of the center portion of the base 10, said center portion being raised above the general plane of the base to form an elongated boss 50. Thus any liquid which may pass through the louvered strips will be contained between the raised bosses 50 and the wind deflectors 25 or 26, and because of the open ends of the wind deflectors, such accumulation will not persist for any appreciable length of time since the liquid will simply flow around the ends of the wind deflectors and drain completely out of said space and upon the roof.

The louvers 51 (FIG. 5) formed in the louvered strips 19 and 20 are substantially identical and are disposed in an almost vertical direction when the strips are mounted in position in the ventilator. This places the openings 52 between adjacent louvers in the upper side of the strip in its mounted condition so that it is vulnerable to the passage thereinto of precipitation such as rain, snow or hail. However, a portion of the cover 11 overhangs the louvers 51 and the flanges 27 which depend from the sides of the cover extend substantially halfway down the vertical height of the louvered strip so that any precipitation falling vertically cannot enter the space between the louvers. Any laterally moving precipitation is deflected by the wind deflectors 25, 26 before it can reach the said spaces and any precipitation which may chance to fall between the wind deflectors and the edges 28 of the flanges 27 will be at best fall into the lowermost openings 52 in the louvered strips, which spaces are well below opening 18 so that such precipitation will simply flow down between the bottom edge of the louvered strip and the base 10 and then along and around the wind deflectors as previously described.

In a cross wind, air leaves the interior of the roof through openings 17 and 18 and is drawn through the louvers on both sides of the roof ridge by virtue of venturi action created by the baffle on the windward side, as well as by reduced pressure on the lee side. It is important that the air flow area provided by the spaces between the louvers of the strip collectively shall be substantially equal to the areas of the openings 17 and 18 to avoid accomplish this relationship is to insure that the vertical height between the cover 11 and base 10 is substantially equal to the width measured transversely of the line of symmetry of opening 18. This, however, results in a relatively high profile for the ventilator, which is undesirable. In the ventilator of this invention, however, a low profile is maintained without sacrificing area of opening through the louvered strip by inclining the strip in the manner illustrated in FIG. 4. Thus, the sum of the areas of the openings 52 between louvers adjacent an opening 18 is substantially equal to the area of said opening 18 and the desired flow of air is achieved.

It may be recalled that cover 11 extends endwise beyond end posts 14 and 15, as described with reference to the inwardly formed bosses 33 in FIG. 6. The overhanging ends of cover 11 serve to prevent precipitation which may be driven diagonally across cover 11 from entering the upturned louvers 51 around said end posts. The overhang is of sufficient length to ensure that under even extreme conditions of wind and precipitation, substantially none will enter the louvers around said end posts.

It is anticipated that the ventilator will be subjected to extremes of temperature from the subzero temperatures reached in winter to the highest developed under a hot summer sun. The plastic material of which base 10 and cover 11 may be made may be a plastic solid under the trade name of GSE Cyclolac with Korad laminate. The thinness of this material used in the ventilator illustrated, may be 0.050 inch. In extremes of weather, as when exposed to the heat of the sun, the material may tend to buckle by virtue of uneven expansion and contraction, even when the sides and end regions of the base 10 are nailed to the roof. Such buckling, however is inhibited along the sides of the ventilator by the beads 21, 22 extending lengthwise of the ventilator, and at the extreme ends of the base 10 by the beads 23 extending transversely across the portion of the base outside end posts 14 and 15. Additional stiffness is, of course, provided by the wind deflectors 25 and 26, and the central regions of the base 10 are well buttressed against warping or buckling by the posts 14, 15 and 16.

In the form illustrated herein, the ventilator is a complete unit assembled at the factory and mounted on a roof ridge, either alone or in multiples space along the roof ridge. It is contemplated, however, that by overlapping the end regions of the bases 10 of adjacent units, the covers 11 may be made to substantially abut one another so as to give the appearance of a continuous roof ridge. This appearance is reinforced by the simulated overlapping shingle contour molded into the covers 11.

It may be apparent from the above description that the design of the plastic base and cover does not incorporate any reentrant curves and hence both can be made in two-part molds. Such drafts as are required in the design for ready opening of the mold and removal of the molded parts therefrom do not have any deleterious effect either upon the form or function of the completed ventilator. It may also be apparent that the sloping louvered sheets make possible an adequate flow of air through the ventilator while at the same time reducing the silhouette to a minimum. Once installed, the plastic parts of the ventilator require no painting, and by marking the louvered strips aluminum, such strips will likewise require no painting. This is particularly true because the strips are concealed by the cover 11 and the wind deflectors 25 and 26 and hence, even through the aluminum may in time pit, the condition of the finish would not be observable from the group.

I claim:

1. A roof ridge ventilator comprising a *unitary* base sheet of moldable *plastic* material *formed to straddle an open roof ridge,* said *base* sheet being substantially rectangular in outline and having a central boss extending *integrally* upwardly from the plane of said *base* sheet, said boss having an opening therethrough, *inwardly of the ends and side edges of the base sheet,* spaced posts formed in the *base* sheet and extending above the central boss, a cover for the opening *supported on and by said spaced posts at a position spaced above the base sheet and boss,* said cover being formed of moldable *plastic* material, a [louvered] *vented* sheet [disposed] *mounted angularly* in the space between the cover and base *sheet and having upwardly facing louvered openings therein* to allow air to pass from the opening in the boss to the exterior of the ventilator, and means on the cover to prevent entry of moisture into said opening.

2. A roof ridge ventilator as described in claim 1, said base *sheet* having aligned abutments and said [louvered] *vented* sheet being disposed between said cover and said abutments.

3. A roof ridge ventilator as described in claim 1, said posts having downwardly sloping [inwardly extending] ledges *thereon which extend longitudinally of the ventilator and toward one another,* and said [louvered] *vented* sheet overlying and being supported by said ledges.

4. A roof ridge ventilator as described in claim 3, said means on the cover to prevent entry of moisture into said ventilator comprising a peripheral flange, [said cover being supported by said posts] and said [depending flanges] *peripheral flange* extending around said posts and [louvered sheets] *vented sheet in spaced relationship thereto.*

5. A roof ridge ventilator as described in claim 3, said cover [being supported by said posts and] having a pair of downwardly extending bosses [disposed one] on [either side] *opposite sides* of said posts and *disposed to fit* in snug relation thereto to locate said cover lengthwise on the posts.

6. A roof ridge ventilator as described in claim 3, said cover having [temperature] transverse steps formed at regular intervals along its length to provide *structural* stiffness [for said cover] *therein,* said steps simulating [overtapping] *overlapping* shingles.

7. A roof ridge ventilator as described in claim 3, said base *sheet* [having] further *having* a central post disposed between said first-mentioned posts, means securing the cover to the top of said central post, and means securing an intermediate portion of said [louvered] *vented* sheet to the side of said central post.

8. A roof ridge ventilator as described in claim 7, said end and central posts being molded integrally with said base sheet.

9. A roof ridge ventilator as described in claim 1, said base *sheet* having formed therein spaced *and* aligned lugs against which said [louvered] *vented* sheet bears, said lugs serving to raise the [louvered] *vented* sheet above the surface of the base to allow drainage of water under said [louvered] *vented* sheet from the interior of the ventilator to the exterior thereof.

10. A roof ridge ventilator as described in claim 1, said [downwardly extending flanges] *means on the cover to prevent entry of moisture into said opening comprising a flange* extending around the periphery of the cover and *downwardly* substantially to the level of the opening in said boss.

11. A roof ridge ventilator as described in claim 9, said posts having downwardly sloping [inwardly extruding] ledges *thereon which extend longitudinally of the ventilator and toward one another,* said [louvered] *vented* sheet overlying and being supported by said ledges, a central post disposed between said spaced posts, means securing the cover to the tops of said [end] *spaced* and central posts, said [end] *spaced* and central posts being molded integrally with said base sheet, a pair of downwardly extending bosses on the cover disposed to retain *said posts of the base sheet* between them in snug relation thereto [a post of said base sheet] to locate said cover lengthwise with respect to said base sheet, simulated overlapping shingles formed in said cover, and [said downwardly extending flanges] *means on the cover to prevent entry of moisture into said opening comprising a flange* extending around the periphery of the cover and *downwardly* substantially to the level of the opening in said boss.

References Cited

The following references, cited by the Examiner, are of record in the patented file of this patent or the original patent.

UNITED STATES PATENTS

| | | | |
|---|---|---|---|
| 2,924,165 | 2/1960 | Doherty | 98—42 |
| 3,086,323 | 4/1963 | Pine | 52—199 X |
| 3,481,263 | 2/1969 | Belden | 98—42 |
| 3,520,093 | 7/1970 | Painter | 98—43 X |
| 2,207,671 | 7/1940 | King | 98—42 |
| 2,214,886 | 9/1940 | McKeown | 52—199 X |

FOREIGN PATENTS

| | | | |
|---|---|---|---|
| 521,165 | 1/1956 | Canada | 98—42 |

MEYER PERLIN, Primary Examiner.

R. C. CAPOSSELA, Assistant Examiner.

U.S. Cl. X.R.

52—199; 98—66, 82, 83

PO-1050
(5/69)

UNITED STATES PATENT OFFICE
CERTIFICATE OF CORRECTION

Patent No. Reissue 27943 Dated March 19, 1974

Inventor(s) Lester L. Smith

It is certified that error appears in the above-identified patent and that said Letters Patent are hereby corrected as shown below:

Col. 1, line 51, "the" before "sheet metal" should be omitted as on page 2, line 26 of application (col. 1, line 26 of original patent).

Col. 2, line 41, "flastic" should be --plastic-- as on page 3, line 2 (col. 2, line 2 of original patent).

Col. 2, line 55, "earh" should be --each-- as on page 3, line 17 (col. 2, line 17 of original patent).

Col. 3, line 50, after "10" omit "and its top" and insert --so that-- as on page 3, line 73 (col. 2, line 73 of original patent).

Col. 4, line 19, after "44" insert --on one end post to the corresponding inner wall 44-- as on page 4, line 42 (col. 3, line 42 of original patent).

Col. 5, line 5, after "avoid" insert --impeding the flow of air out of the ventilator. One way to--, as on page 5, line 26 (col. 4, line 26 of original patent).

Col. 5, line 31, "solid" should be --sold-- as on page 5, line 52 (col. 4, line 52 of original patent).

Col. 5, line 69, "marking" should be --making-- as on page 6, lines 11 and 12 (col. 5, lines 11-12 of original patent).

Col. 5, line 73, "through" should be --though-- as on page 6, line 15 (col. 5, line 15 of original patent).

Col. 5, line 75, "group" should be --ground-- as on page 6, line 17 (col. 5, line 17 of original patent).

Signed and sealed this 17th day of September 1974.

(SEAL)
Attest:

McCOY M. GIBSON JR.
Attesting Officer

C. MARSHALL DANN
Commissioner of Patents